United States Patent [19]

Suzuki et al.

[11] Patent Number: 5,136,389
[45] Date of Patent: Aug. 4, 1992

[54] IMAGE SENSOR DRIVING METHOD WITH HIGH-SPEED VOLTAGE RESPONSE

[75] Inventors: Kouhei Suzuki, Yokohama; Chiaki Tanuma, Tokyo; Satoshi Takayama, Kawasaki; Kenichi Mori, Yokohama, all of Japan

[73] Assignee: Kabushiki Kaisha Toshiba, Kawasaki, Japan

[21] Appl. No.: 442,555

[22] Filed: Nov. 29, 1989

[30] Foreign Application Priority Data

Nov. 29, 1988 [JP] Japan .................. 63-299462

[51] Int. Cl.$^5$ .................................. H04N 5/335
[52] U.S. Cl. .................. 358/713.31; 358/482; 357/30
[58] Field of Search .............. 358/213.31, 213.11, 358/482, 471; 357/30 I, 30 P

[56] References Cited

U.S. PATENT DOCUMENTS

| | | | |
|---|---|---|---|
| 3,721,839 | 3/1973 | Shannon | 357/30 I |
| 3,964,083 | 6/1976 | Lohstroh | 357/30 I |
| 4,591,917 | 5/1986 | Suzuki | 358/213.11 |
| 4,775,880 | 10/1988 | Suzuki et al. | 357/30 |
| 4,845,355 | 7/1989 | Nakagawa et al. | 357/30 I |
| 4,858,022 | 8/1989 | Suzuki | 358/471 |
| 4,876,703 | 10/1989 | Urata et al. | 358/213.31 |
| 4,886,962 | 12/1989 | Gofuku et al. | 250/211 J |
| 4,886,977 | 12/1989 | Gofuku et al. | 357/30 K |
| 4,916,304 | 4/1990 | Itabashi et al. | 250/211 R |

FOREIGN PATENT DOCUMENTS

| | | | |
|---|---|---|---|
| 58-18978 | 2/1983 | Japan . | |
| 60-239072 | 11/1985 | Japan . | |
| 63-1055 | 1/1988 | Japan . | |
| 0240065 | 10/1988 | Japan | 358/213.11 |

OTHER PUBLICATIONS

Komiya et al., "A 2048-Element Contact Type Linear Image Sensor for Facsimile," IEDM 1981 Technical Digest, pp. 309-312.

Saika et al., "Integrated a-Si:H Linear Image Sensor Using TFT Type Photo-Sensor," Extended Abstracts of the 19th Conference on Solid State Devices and Materials, Tokyo, 1987, pp. 509-510.

*Primary Examiner*—James J. Groody
*Assistant Examiner*—Jeffrey S. Murrell
*Attorney, Agent, or Firm*—Foley & Lardner

[57] ABSTRACT

A method for driving an image sensor, the image sensor including a pair of first and second main electrodes fabricated on a semiconductor layer in such a manner that the first and second main electrodes are separated with each other via a light receiving region. An insulating layer is stacked on the semiconductor layer and an auxiliary electrode then stacked on the insulating layer. The method includes the steps of applying a constant bias voltage to the auxiliary electrode over both a read time period and a non-read time period of a signal current of the image sensor.

18 Claims, 7 Drawing Sheets

IMAGE SENSOR DRIVING METHOD WITH HIGH-SPEED VOLTAGE RESPONSE

BACKGROUND OF THE INVENTION

1. Field of the Invention

The present invention generally relates to a method for driving a photo-sensor. More specifically, the present invention has been directed to a driving method for a image sensor typically employed in a facsimile machine and an image scanner.

2. Description of the Related Art

Recently, a great attention is paid to a contact type image sensor capable of optically reading image information of an original at equal magnification as image input units of facsimiles and image scanners and other appliances. This contact type image sensor owns such particular advantages as compactness and low cost, since this image sensor is so arranged that the focussing optical system is eliminated by setting the image sensor directly to the original with keeping the contact condition, or another optical system having the shorter optical length of the focussing system.

In general, a contact type image sensor is fabricated such that a large number of photo-sensors having a width substantial equal to that of an original are arranged at a higher density so as to obtain a desirable resolution.

Then, a so-called "matrix driving type image sensor" is commercially available in which a plurality of photo-sensors are electrically connected in a matrix form so as to make such a matrix driving type image sensor compact at a lower cost by reducing a total number of the driving (or selecting) elements for scanning these photo-sensors.

In such a image sensor, a high-speed reading operation of information is demanded. To this end, a large quantity of photo-sensors must satisfy the following two conditions; 1) a better photo-responsive characteristic of a signal current, capable of responding incident light, and 2) a better voltage response characteristic of the signal current, capable of responding a drive voltage.

To achieve the improved photo-responsive characteristic, as one of the typical demanded characteristics, one conventional image sensor has been proposed in Japanese KOKAI (Disclosure) patent No. 58-18978 opened on Feb. 3, 1983. In this image sensor, two main electrodes are formed over one major surface of the amorphous semiconductor layer in order to detect the changes in the conductivity in response to the intensity of the incident light. Further, the auxiliary electrode is formed via the insulating layer on the other major surface. Then, the potential is applied to the amorphous semiconductor layer with utilizing two main electrodes and the auxiliary electrode.

Also, other conventional photo-sensors (image sensors) have been described in, for instance, Japanese KOKAI (Disclosure) patent applications No. 63-1055 opened on Jan. 6, 1988, and No. 60-239072 opened on Nov. 27, 1985. These photo-sensors each has the auxiliary electrode and the bias voltages applied to this auxiliary electrode are changed during the read time period and also non-read time period, whereby the photo-responsive characteristic thereof can be furthermore improved.

The typical structure and the connecting relationship between the structure of the conventional image sensor and the drive power source will now be summarized.

The structure of the conventional image sensor is so fabricated as follows. The auxiliary electrode and insulating layer are successively stacked on the insulating substrate. The amorphous semiconductor layer, such as an amorphous silicon (a-Si:H), is formed on the stacked layer. Further, a pair of main electrode are fabricated via the doped semiconductor layer for the ohmic contact on this amorphous semiconductor layer. The region between these main electrodes functions as the light receiving window.

In the above-described conventional image sensor described in Japanese KOKAI patent application No. 63-1055, in case that, for instance the amorphous semiconductor layer is of n type (including an intrinsic type semiconductor layer) and the doped semiconductor layer is of n+ type (including an n type), the high drive voltage is applied to one main electrode with respect to the potential of the other main electrode as the reference potential, the first bias voltage "$-V_1$" having the low potential is applied to the auxiliary electrode during the read time period and the second bias voltage "$-V_2$" ($|V_1| < |V_2|$) is applied via the switch to the auxiliary electrode during the non-read time period. In this conventional photo sensor, the major carrier is an electron, one main electrode is a source, and the other main electrode is a drain. Although a detailed operation of this image sensor is described in the above patent application, a simple explanation will now be made. When the light is incident via the light receiving window upon the amorphous semiconductor layer, both the electrons and holes are produced in the amorphous semiconductor layer at a predetermined concentration corresponding to the quantity of the incident light. As a result, the conductivity of the amorphous semiconductor layer is increased. As a result, under this condition, if the drive voltage is applied between this pair of main electrodes, the signal current corresponding to the changes in this conductivity can be derived.

However, the electrons and/or holes remain in the amorphous semiconductor layer even when no light is incident upon the image sensor, so that the residual current continuously flows through the image sensor. This residual current may cause the photo-responsive characteristic to be deteriorated.

As clearly described in the above-described patent application No. 58-18978, a little improvement can be achieved in the above-described delay of the photo-responsive velocity of the conventional image sensor by applying the first bias voltage "$-V_1$" to the auxiliary electrode so as to bring the localized states within the amorphous semiconductor layer to the inert condition. Furthermore, as previously described, the second bias voltage "$-V_2$" is applied to the auxiliary electrode during the non-read time period in order to lower the concentration of the holes and electrons present in the amorphous semiconductor layer. As a result, when the electrons and holes produced by the above incident light are further recombined with each other, the time required during which the residual current reaches the originally set dark current level can be shortened so that the photo-responsive velocity (characteristic) may be furthermore improved.

As previously described in detail, the photo-responsive characteristic of the conventional image sensor can be eventually improved by way of the above-described sensor driving method. However, the remaining major characteristic, i.e., the voltage response characteristic of the conventional image sensor having no auxiliary electrode is not improved, but also deteriorated as compared with that of another conventional image sensor having the auxiliary electrode. This is because the carrier injection required for the quick voltage response operation of the conventional image sensor might be not properly carried out.

In particular, such a delay voltage response may cause serious problems in the matrix driving type image sensor. That is, in the matrix driving type image sensor, the pulsatory drive voltages are applied to the respective image sensor elements, as previously described.

In this case, when the signal current responses to the respective image sensors with respect to such drive pulses are delayed, the time period required for 1-line read operation becomes extremely long while the image sensor elements are sequentially selected so as to read the signals in the serial form. The high-speed signal read operation by the conventional image sensor can be hardly expected. For instance, in case that such a conventional linear image sensor is employed in the GIII type facsimile machine, since the total number of the sensor elements amounts to approximately 2,000 and the 1-line read time requires 5 to 10 milliseconds, the necessary voltage response time thereof is about 2.5 to 5 microseconds. However, as previously described in detail, the practical voltage response of the conventional image sensor in response to the above-described conventional drive voltage is on the order of milliseconds, namely very slow, which is not practically available.

SUMMARY OF THE INVENTION

The present invention has been made in an attempt to solve the above-described problems of the conventional linear image sensor, and therefore, has an object to provide a method for driving an image sensor with an improved photo-responsive characteristic, and also improved voltage response characteristics.

To achieve the above-described object and other features of the present invention, a method for driving an image sensor including: a pair of first and second main electrodes (16: 17) fabricated on a semiconductor layer (14) in such a manner that the first and second main electrodes (16: 17) are separated with each other via a light receiving region; an insulting layer (13) stacked on the semiconductor layer (14); and an auxiliary electrode (12) stacked on said insulating layer (13), comprising the steps of:

applying a constant bias voltage ($-V_{11}$) to the auxiliary electrode (12) over both a read time period ($T_1$) and a non-read time period ($T_0$) of a signal current ($I_D$) of the image sensor;

applying to the first main electrode (16), a drive voltage pulse ($-V_{10}$) by which a carrier injection into the semiconductor layer (14) is accelerated to vary a potential at the first main electrode (16) with respect to the auxiliary electrode (12) at least during the read time period ($T_0$) of the signal current ($I_D$); and, deriving the signal current ($I_D$) from the second main electrode (17) during only the read time period ($T_1$) of the signal current ($I_D$).

In accordance with the present invention, the voltage response of the signal current in response to the drive voltage can be further improved while realizing the advantages of the photo-responsive characteristic. This particular feature of the present invention w now be described in comparison with the effects of the conventional sensor driving method.

As a result of the Applicants' research, the following fact is confirmed in the conventional driving method for an image sensor. That is, at a time instant where the positive drive voltage is applied to the drain electrode of the conventional image sensor, the high potential is applied only to the region adjacent the drain electrode as the potential distribution of the internal semiconductor layer, and also only this adjacent region is replenished. However, there is no change in the potential distribution of another region adjacent to the source electrode. Therefore, the electrons as the carrier capable of causing the signal current flowing through the semiconductor layer are not injected from the source electrode. In other words, since the voltage between the source electrode and auxiliary electrode positioned very close to the semiconductor layer are kept constant, the electric line of force due to the potential change of the drain electrode is absorbed by the auxiliary electrode, and thus the internal potential of the semiconductor layer adjacent to the source electrode does not quickly change but gradually changes in accordance with the dielectric relaxation, e.g., several milliseconds. Then, in response to this potential change, the electron injection from the source electrode is increased and the signal current reaches the stationary current. As a result, the resultant voltage response of the conventional image sensor becomes delayed.

To the contrary, according to the image sensor the present invention, since such a voltage that the carrier injection can be emphasized is applied to the source electrode (or auxiliary electrode) thereof so as to induce the potential change in the auxiliary electrode (or source electrode) thereof, the internal potential of the semiconductor layer adjacent to the source electrode is varied at the time instant when the drive voltage is applied to the source electrode so that the carrier can be injected from the source electrode. As a result, the signal current of the image sensor can rapidly flow in response to the change of the drive voltage.

BRIEF DESCRIPTION OF THE DRAWINGS

For a better understanding of the present invention, reference is made to the following descriptions in conjunction with the accompanying drawings, in which.

DETAILED DESCRIPTION OF THE PREFERRED EMBODIMENTS

Structure of First Linear Image Sensor

Figure 1A:
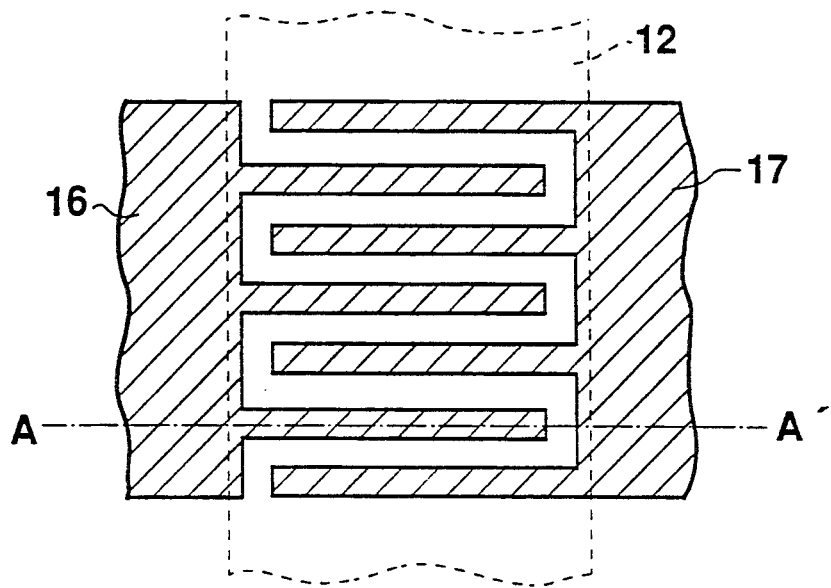
FIG. 1A schematically shows a plan view of a image sensor according to a first preferred embodiment of the invention.
Figure 1B:
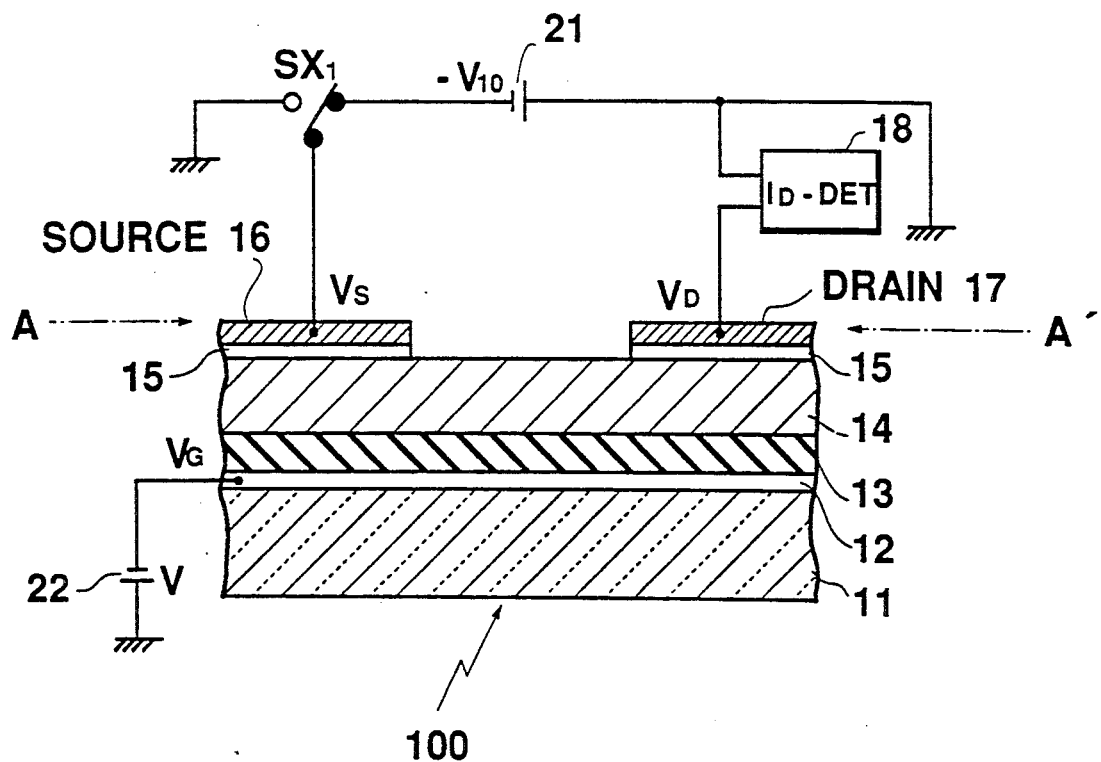
FIG. 1B schematically illustrate a sectional view of the image sensor taken along a line A-A' shown in FIG. 1A and a sensor driving circuit.

In FIG. 1A, there is shown a plan view of a single element of a linear image sensor, or photo-sensor arranged in a line form. FIG. 1B schematically represents a cross-sectional view of the image sensor taken along a line A–A' shown in FIG. 1A, and also a drive power source, to which a driving method according to a first preferred embodiment of the invention has been applied.

First, a structure of the photo-sensor, or image sensor will now be described. As shown in FIG. 1B, a transparent auxiliary electrode 12 is formed on a glass substrate 11. A doped semiconductor layer 14 is fabricated via an insulating layer 13 on this transparent auxiliary electrode 12. A pair of main electrodes 16 and 17 are formed via a doped semiconductor layer 15 for an ohmic contact on the semiconductor layer 14, with being separated by a light receiving region. Light 100 is incident upon the glass substrate 11 and transferred via the transparent auxiliary electrode 12 into the semiconductor layer 14. A quantity of photons incident on this semiconductor layer 14 may be increased approximately two times greater than that of the conventional image sensor. As a result, both the sensitivity (the signal current "$I_D$") and the photo-responsive characteristic of the image sensor may be improved according to the first preferred embodiment. In addition, a total amount of light incident on the semiconductor layer 15 may be increased to a maximum value by properly selecting the thicknesses of the insulating layer 13 and transparent auxiliary electrode 12 with respect to the refraction index thereof and the wavelength of the incident light (will be discussed later). Thus, the signal-to-noise ratio and photo-responsive characteristic may be improved. Furthermore, if a reflection preventing film so-called as "non-reflective coat" is formed on the light incident surface of the glass substrate 11, the above-described features of the present invention may be further improved.

It should be noted that the main electrodes 16 and 17 may be formed as transparent electrodes. Also, in case that the light is incident upon the glass substrate 11, both the main electrodes 16 and 17 may be formed as light reflective electrodes. Conversely, in case the light is incident upon the main electrode side, the auxiliary electrode may be formed as a light reflective electrode. Accordingly, the light incident upon the latter image sensor can be more effectively utilized, as compared with the former image sensor.

Maximum Incident Light Intensity

As previously described, when both the thicknesses of the insulating layer 13 and of transparent auxiliary electrode 12 are selected to satisfy the following equation (1), the incident light intensity to the semiconductor layer 15 can be set to the maximum value.

$$n \cdot d = m \cdot \lambda / 4 \quad (1)$$

where "n" denotes a refraction index, "d" represents a layer thickness, "λ" indicates the wavelength of the incoming light, and "m" is selected from an odd number (1, 3, 5, - - - ).

Manufacture of First Linear Image Sensor

The above-described linear image sensor may be manufactured by the following manufacturing process.

First, ITO (indium tin oxide) is deposited at a thickness of 700 angstroms by the sputtering method on the glass substrate 11. Thereafter, the deposited substrate 11 is patterned by way of the photolithography so as to form the auxiliary electrode 12. Then, a SiOx:H layer having a thickness of 3,500 angstroms as the insulating layer 13 is deposited on this auxiliary electrode 12. An undoped amorphous silicon hydroxide (a-Si:H) layer 14 having a thickness of 1 micron is deposited on this insulated layer 13. Furthermore, a doped phosphorous (a-Si) layer (n+layer) is deposited as the doped semiconductor layer 15 on the first-mentioned semiconductor layer 14 by way of the glow discharge resolution method. The above-described depositions are successively carried out. Thereafter, Ti (titanium) having 3,000 angstroms is deposited on the doped semiconductor layer 15 by the vacuum vapor deposition, and subsequently, the deposited layer is first patterned by the lithography. Then, the unnecessary semiconductor layer portion used as the lead portion for the auxiliary electrode is removed by the dry etching method while utilizing this titanium pattern as the mask. Subsequently, the titanium is secondly patterned by the photolithography to form the main electrodes 16 and 17. The unnecessary doped semiconductor layer 15 is removed while utilizing these main electrodes as the mask, whereby the image sensor according to the first preferred embodiment may be manufactured.

First Driving Method

Figure 2:
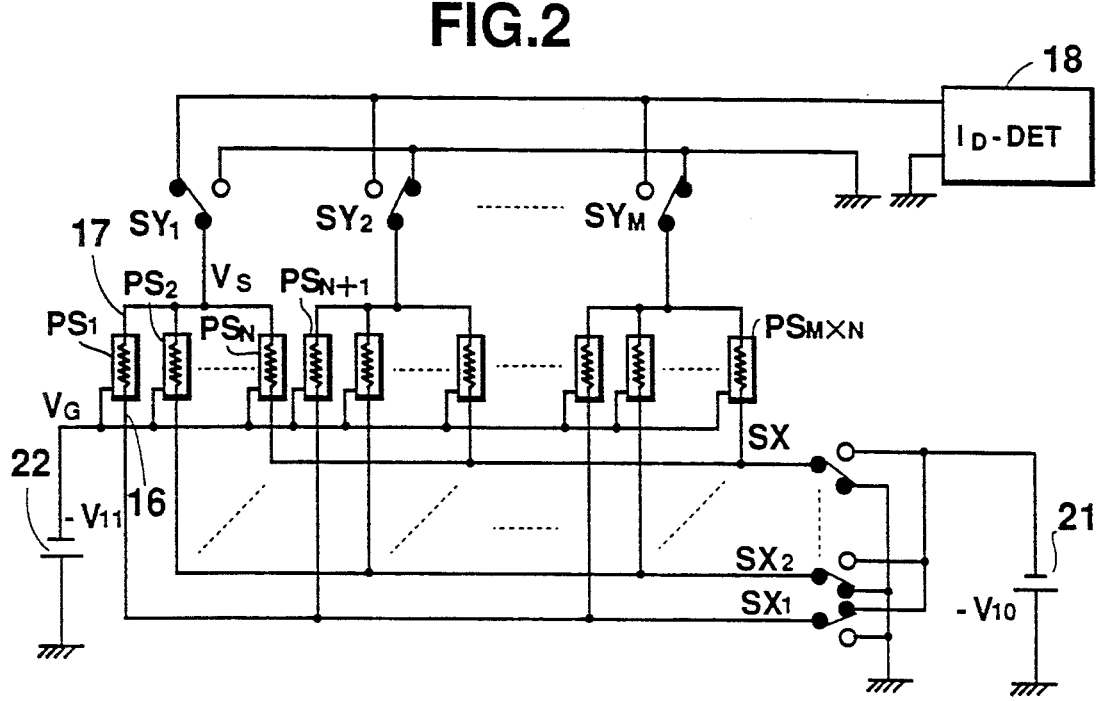
FIG. 2 is a schematic circuit diagram of the image sensor shown in FIG. 1.
Figure 3:
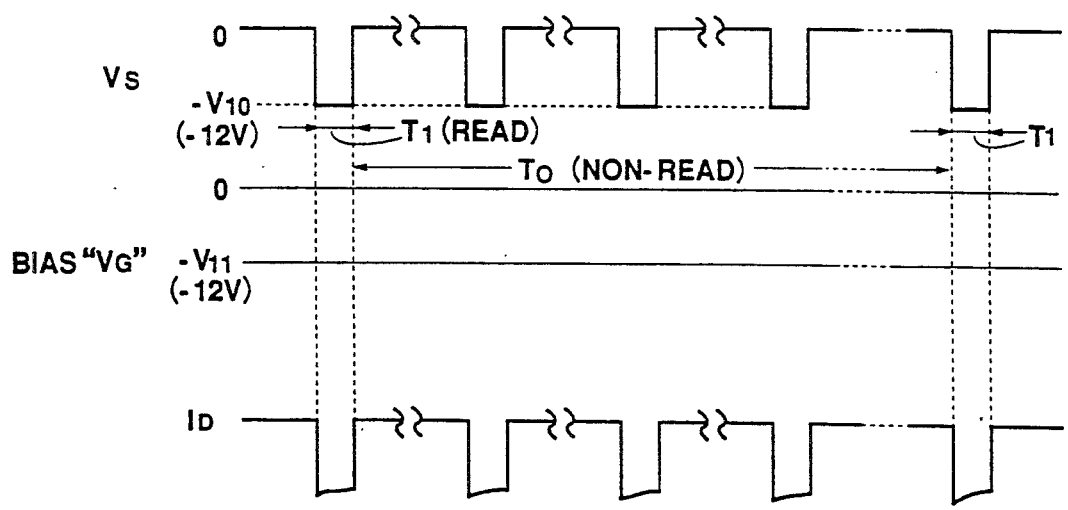
FIG. 3 is a timing chart for representing the driving operations of the image sensor shown in FIG. 1.

Referring now to FIGS. 1 to 3, a method for driving the linear image sensor according to the first preferred embodiment will be described. It should be noted that the undoped semiconductor layer 14 is of n (including n-type) or intrinsic type, and the doped semiconductor layer 15 is of n type according to the first preferred embodiment. As a consequence, the major carrier for carrying the current of the semiconductor layer 14 is an electron. To drive the image sensor with the above-described structure, as shown in FIG. 1, both a drive power source 21 and a bias power source 22 are provided according to the first preferred embodiment.

As the driving power source 21, for instance, a DC power source having 12 volts ($=V_{10}$) is employed. A plus terminal of DC power source 21 is grounded, and connected via a drive current detector (ID detector) 18 to one main electrode 17 functioning as a drain. A negative terminal of the DC power source 21 is selectively connected via a switch SX (a switch $SX_1$ in FIG. 1B) to another main electrode 16 functioning as a source.

On the other hand, another DC power source similarly having 12 volts ($=V_{11}$) is employed as the bias power source. A plus terminal of this DC power source 22 is grounded, whereas a negative terminal thereof is connected to the auxiliary electrode 12.

FIG. 2 is a schematic block diagram of the first image sensor to which the above-described sensor driving power source is connected. As apparent from FIG. 2, a large number of image sensors $PS_1$, $PS_2$, - - - , $PS_{M \times N}$ are subdivided into N (e.g., 32) x M (e.g., 54) blocks. The respective source electrodes 16 of each of image sensors, for instance, $PS_1$, - - - , $PS_N$ corresponding to the respective blocks are commonly connected to each other, and via the switches $SX_1, ---, SX_N$ to the drive power source 21. Also, the respective drain electrodes 17 of N pieces of the image sensors, $PS_1, ---, PS_N$ constituting the respective blocks are commonly connected to each other, and via the common switch $SY_1$ to the drive current detector 18. Similarly, other image sensors are connected with the source electrodes 16 thereto, and via the switch $SX_1, ---, SX_N$ to the drive power source 21. The drain electrodes of other image sensors are connected with each other and via the respective switches $SY_2, ---, SY_M$ to the drive current detector 18.

As a result, the respective image sensors are sequentially driven by switching the corresponding switches $SX_1, ---, SX_N$ and $SY_1, ---, SY_M$, whereby serial driving currents "$I_D$" are derived from the current detector 18. For instance, first the switch $SY_1$ is changed into the current detector 18 (i.e., left side viewed in FIG. 2). During this switch changing time period, other switches $SX_1$ to $SX_N$ are successively changed one by one from the ground side to the drive power source 21, for, e.g., 5 microseconds respectively, and also the drive voltage ($-V_{10}$) is successively applied to the connected source electrodes 16. Accordingly, the image sensors $PS_1$ to $PS_N$ are sequentially selectively driven, so that the respective signal currents are serially derived from the current detector 18.

After the last image sensor $PS_N$ has been selectively driven at a predetermined time, e.g., 160 microseconds (N=32, then 5×32=160 microseconds), the first switch $SY_1$ is changed from the current detector 18 to the ground (right side as viewed in FIG. 2), and thereafter the second switch $SY_2$ is changed from the ground to the current detector 18. Then, other switches $SX_1$ to $SX_N$ are sequentially switched from the ground to the drive power source 21. As a consequence, the image sensors $PS_{N+1}, PS_{N+2}, ---$ of the next block are selectively driven. The similar sensor driving method is performed for the remaining image sensors.

When a single image sensor, e.g., $PS_1$ shown in FIG. 1 is considered, the following drive conditions are provided according to the first preferred embodiment. As shown in the timing chart of FIG. 3, while a constant bias voltage "$V_G$" having, e.g., 12 V is being applied to the auxiliary electrode 12, a pulsatory drive voltage "$V_S$" is applied to the source electrode 16 every time the first switch $SX_1$ is changed from the ground to the drive power source 21. It should be noted the constant light 100 is incident upon the glass substrate 11 of this image sensor in the first preferred embodiment. Although the signal current $I_D$ flows every time the switch $SX_1$ is changed into the drive power source 21 and also the drive voltage $V_S$ is applied, this signal current is derived only when the other switch $SY_1$ is changed from the ground into the current detector 18. That is, the signal current "$I_D$" is derived only during the read time period "$T_1$", and is not derived during the non-read time period "$T_0$".

Figure 4A:
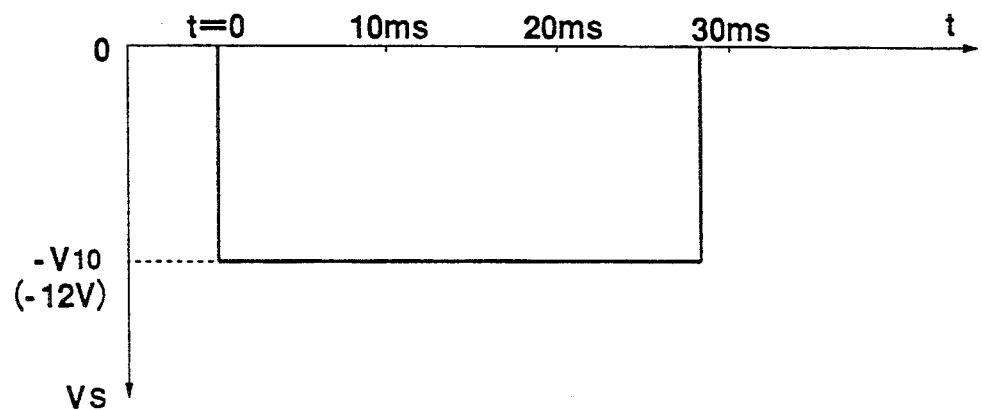
FIG. 4A and 4B graphically represents sensor characteristics of the conventional sensor and inventive sensor.
Figure 4B:
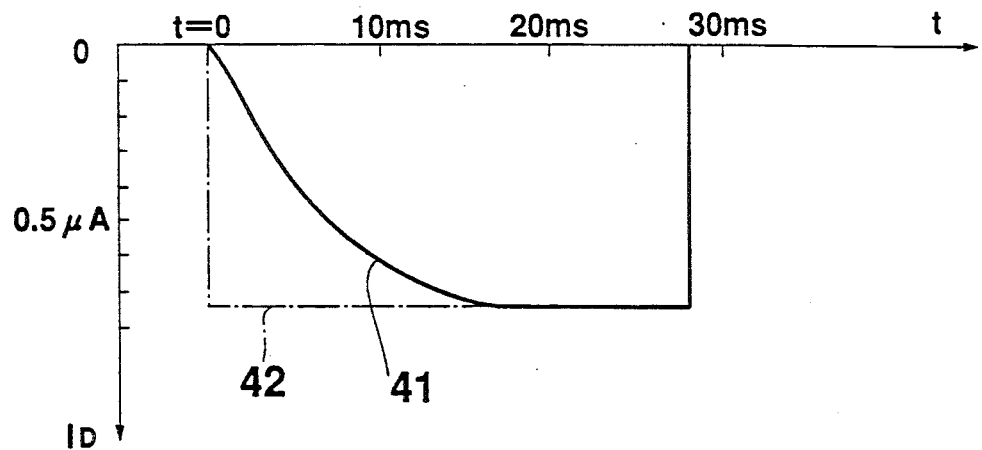

In accordance with the first preferred embodiment, since the drive voltage pulse "$V_S$" is being applied to the source electrode 16 during the read time period "$T_1$", the potential inside the non-doped semiconductor layer 14 adjacent the source electrode 16 is varied at a time instant of the drive pulse ($V_S$) application, so that the carriers happen to be injected from the source electrode 16, which is completely different from prior art. As a result, the signal current $I_D$ can quickly flow in response to the drive pulse $V_S$. There are particular advantages of the first preferred embodiment. For instance, in response to the drive voltage pulse $V_S$ as represented in FIG. 4A, the conventional voltage response, as indicated by a curve 41 of FIG. 4B, is very slow, on the order of milliseconds, whereas the inventive voltage response, as denoted by another curve 42 in FIG. 4B, becomes very fast, i.e., less than 1 microsecond.

Furthermore, since the signal current $I_D$ is derived from the drain electrode 17 which is kept at a constant potential (ground potential), and also the potential of the auxiliary electrode 12 is maintained constant as to the signal current read timing "$T_1$", the noises caused by the large surge current which transiently flows in response to the changes in the drive voltage, can be minimized. In other words, a single-to-noise ratio of the signal current can be improved.

Second Image Sensor

Figure 5:
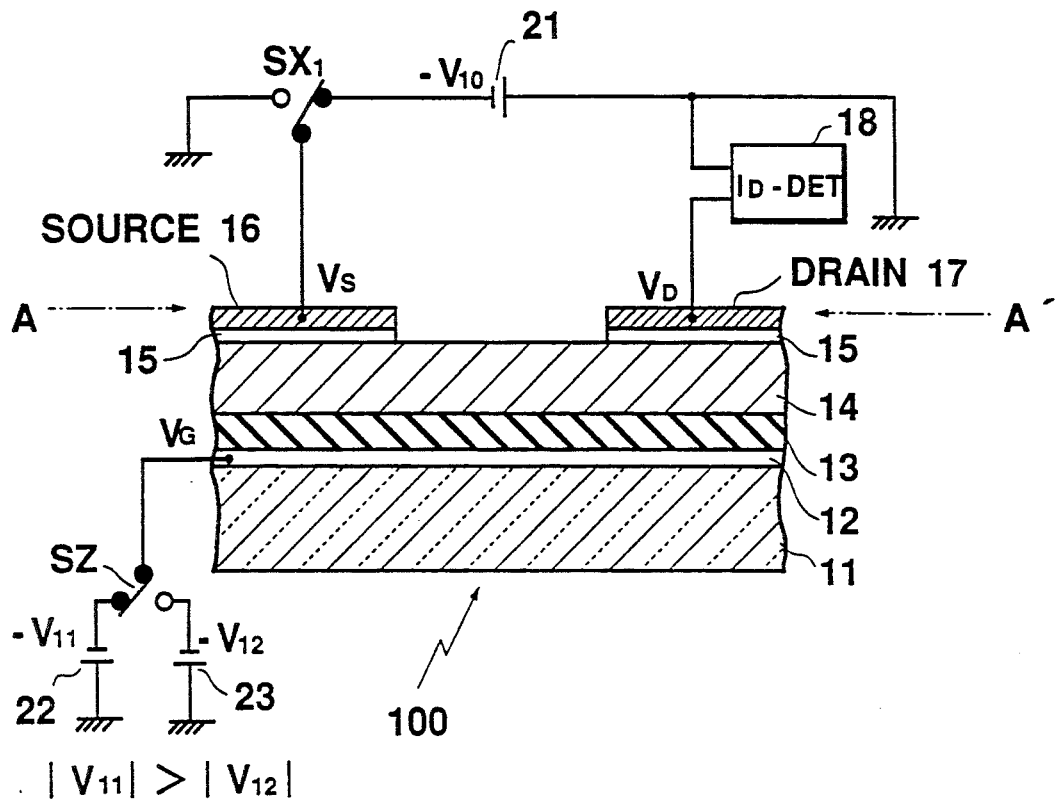
FIGS. 5 and 6 represent an image sensor according to a second preferred embodiment.
Figure 6:
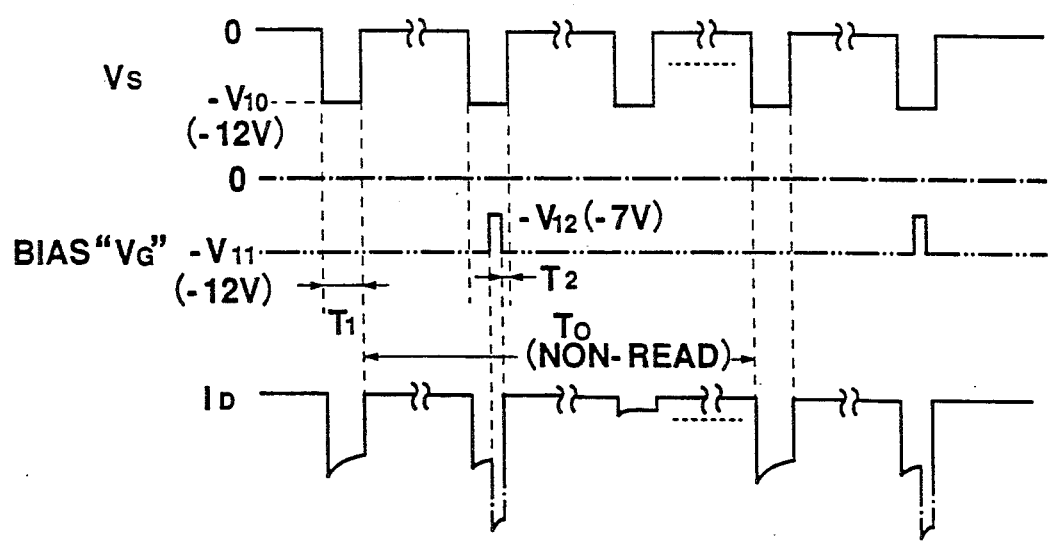

In FIG. 5, there is shown a structure of a linear image sensor and a relevant power source according to a second preferred embodiment of the invention. A major feature of this second preferred embodiment is to further improve the photo-responsive characteristic of the image sensor. Only different points from the previous preferred embodiment will now be described, for the sake of simplicity. That is, in addition to the first bias power source 22, another bias power source 23 capable of applying a voltage "$-V_{12}$" (i.e., $|V_{12}| < |V_{11}|$) is further employed, and also another switch "SZ" is employed so as to selectively change these first and second bias power sources 22 and 23. As a result, the different bias voltage "$V_G$" can be applied to the auxiliary electrode 12. The changing timings of this switch SZ are performed as represented in FIG. 6 between the bias power sources 22 and 23. During a read time period "$T_1$", the drive voltage pulse $V_S$ having the voltage "$-V_{10}$" (e.g., −12 volts) and the bias voltage having the voltage "$-V_{11}$" (e.g., −12 volts) are applied to the second image sensor so as to derive the signal current "$I_D$". Thereafter, during the non-read time period "$T_0$" until the next read time period "$T_1$", the switch SZ is changed from the bias power source 22 to the bias power source 23 for a predetermined time period ("$T_2$" (e.g., 1 microsecond) during which the drive voltage pulse $V_S$ is being applied. Thus, another bias voltage "$V_{-12}$" (e.g., −7 volts) is applied to the auxiliary electrode 12. When the bias voltage "$-V_{12}$" slightly higher than the other bias voltage "$-V_{11}$" is applied to the auxiliary electrode 12, the electron injection from the source electrode 16 may be increased so that the number of holes present within the amorphous semiconductor layer 14 is reduced due to the recombination between the injected excessive electrons and holes. As a consequence, the hole density is lowered as compared with that of the image sensor before this bias voltage "$-V_{12}$" is applied. This implies that the reduction of the positive charges (holes) is equal to the increase of the negative charges. Since the space charge density within the amorphous semiconductor layer 14 is changed in the direction of the negative charge, the electron injection from the source electrode 16 is restricted as compared with that before the second bias voltage "$-V_{12}$" is applied, and thus the signal current "$I_D$" rapidly decreases. Thereafter, the holes are stored which have been produced by the light irradiation for the time period until the second bias voltage "$-V_{12}$" is again applied, so that the space charge density is varied in the positive charge direction, the electrode 16 is gradually increased, whereby the signal current "$I_D$" is increased.

While the light 100 is projected to this second image sensor, the above-described operations are performed. When the light projection is interrupted, the signal current "$I_D$" remains small with reduction of the hole (positive space charge) density after the second bias voltage "$-V_{12}$" has been applied.

Improved Photo-Responsive Characteristics

As a consequence, the sensor output correctly responding to the intensity of the incident light 100 can be obtained according to the second preferred embodiment by the following method. That is, the signal current "$I_D$" is detected as the signal current of the image sensor during a time period which is determined after a preselected time period has passed since the second bias voltage "$-V_{12}$" was applied, and just before the second bias voltage "$-V_{12}$" is again applied. This implies that the photo-responsive characteristic (velocity) of the image sensor can be further improved.

The applicants have had the following experimental results.

Figure 7:
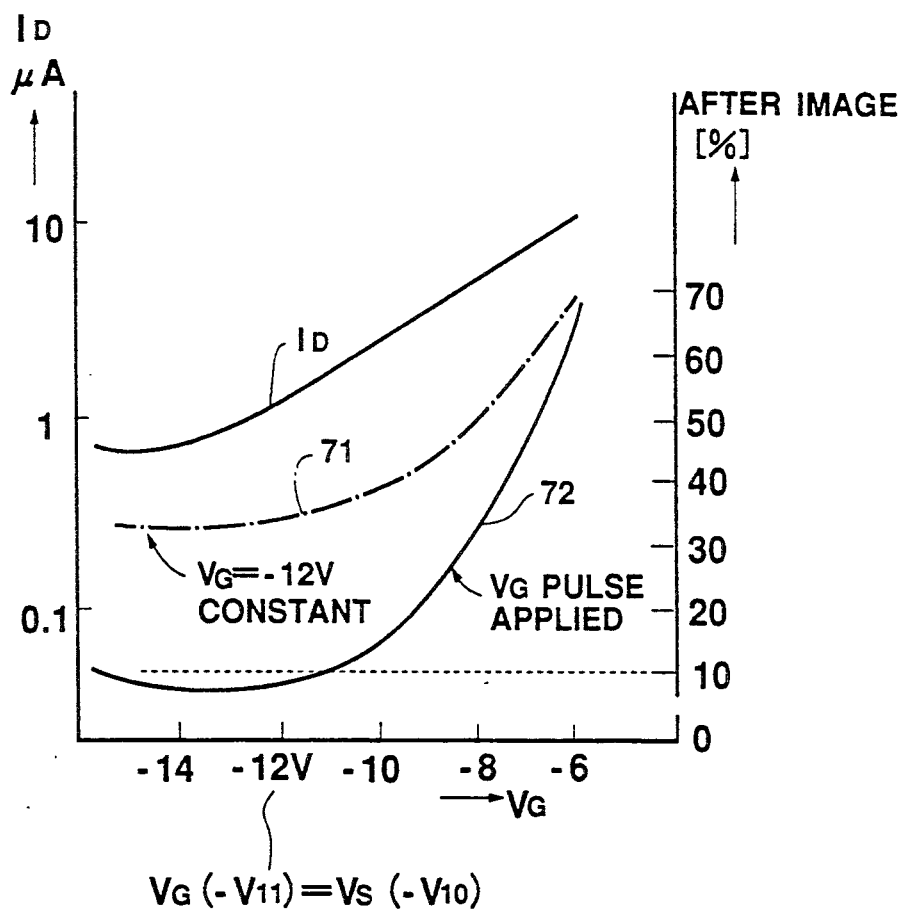
FIG. 7 graphically represents relationships between after image and bias voltage of the second image sensor shown in FIG. 5.

When light having the intensity of illuminance of 100 lux. was interruptedly incident for 10 milliseconds at the time interval of 10 milliseconds, the after image signal current was 35%, as represented in FIG. 7, in case that the bias voltage "$V_G$" was set to be constant at $-12$ volts as in the first preferred embodiment, under the condition that the pulse crest value of the drive voltage "$V_S$" was selected to be $-12$ V (see a curve 71 indicated in FIG. 7). To the contrary, when the second bias voltage "$V_G$" ($=-7$ volts) was applied to the auxiliary electrode 12 under the same incident light condition, the after image signal current could be reduced to 10% or less, as indicated by another curve 72, and also the linearity of the signal current "$I_D$" with respect to the intensity of the incident light was greatly improved. In other words, this linearity could be improved as to the gamma values from 0.6 ($V_G$=DC bias) to 0.95 through 1.05 ($V_G$=a predetermined pulse being applied). It should be noted that FIG. 7 is a graphic representation of the changes in the after image of the signal current (sensitivity) with respect to the bias voltage "$V_G$" in case that the pulse crest value of the drive voltage $V_S$ was selected to be $-12$ volts.

As obvious from two curves 71 and 72 shown in FIG. 7, in case that the bias voltage "$V_G$" applied to the auxiliary electrode 12 was substantially equal to the drive voltage $V_S$, the light current of the image sensor could be increased as compared with that of another case that bias voltage "$V_G$" was not equal to the drive pulse "$V_S$". As a consequence, the after image of the second image sensor could be reduced and thus the photo-responsive characteristic thereof could be improved.

Also, the Applicants have confirmed the following facts. When the pulse crest value ($[-V_{12}]-[-V_{11}]$) of the bias voltage $V_G$ was increased, the after image of the second image sensor was lowered. If this pulse crest value was excessively increased, the linearity was deteriorated (i.e., the gamma value exceeds greatly over 1 under the lower luminance) since the negative space charge relatively became excessively large. It was confirmed that the gamma value was 1 when the pulse crest value of the bias voltage $V_G$ was 4 volts (i.e., $[-7]-[-12]=5$ v under the above conditions, whereas this pulse crest value was selected to be 7 volts, the gamma value was equal to 1.4). However, the Applicant could confirm that the after image of the second image sensor could be reduced without deteriorating the linearity by increasing the total number of the pulse application of the bias voltage "$V_G$" during the non-read time period thereof, during which the signal current "$I_D$" was detected. Also, we confirmed that the total number of this pulse application was 2 to 4,000, although the sensor drive conditions and the sensor manufacturing conditions may cause this total time.

Furthermore, according to the second preferred embodiment, the charge in the light sensitivity can be compensated by varying the bias voltage values ($-V_{11}$, $-V_{12}$) which have been applied between the source electrode 16 and auxiliary electrode 12 during the time period where no drive voltage is applied between the main electrodes 16 and 17, depending upon the changes in the opto-electric converting sensitivity of the second image sensor. It should be noted that although the amplitude of this bias voltage or the opto-electric converting sensitivity has not always the independent relationship with the photo-responsive sensitivity, there is a specific drive condition region where these items can be relatively independently controlled with each other. As a consequence, the deteriorations of the sensitivity and linearity, which are caused by the incident light upon the image sensor, so called as "Staebler-Wronski Effect", can be compensated by changing the bias voltages $-V_{11}$ and $-V_{12}$.

Third Image Sensor

Figure 8:
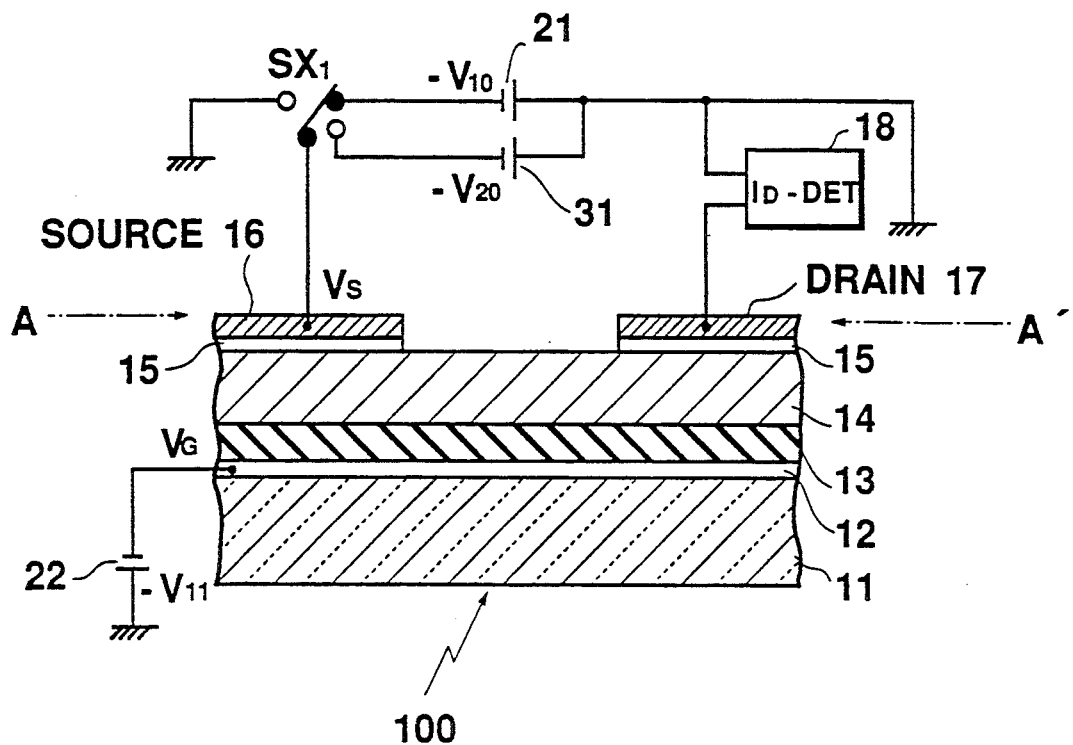
FIGS. 8 and 9 schematically illustrate an image sensor according to a third preferred embodiment; and, FIGS. 10 and 11 schematically represent an image sensor according to a fourth preferred embodiment of the invention.
Figure 9:
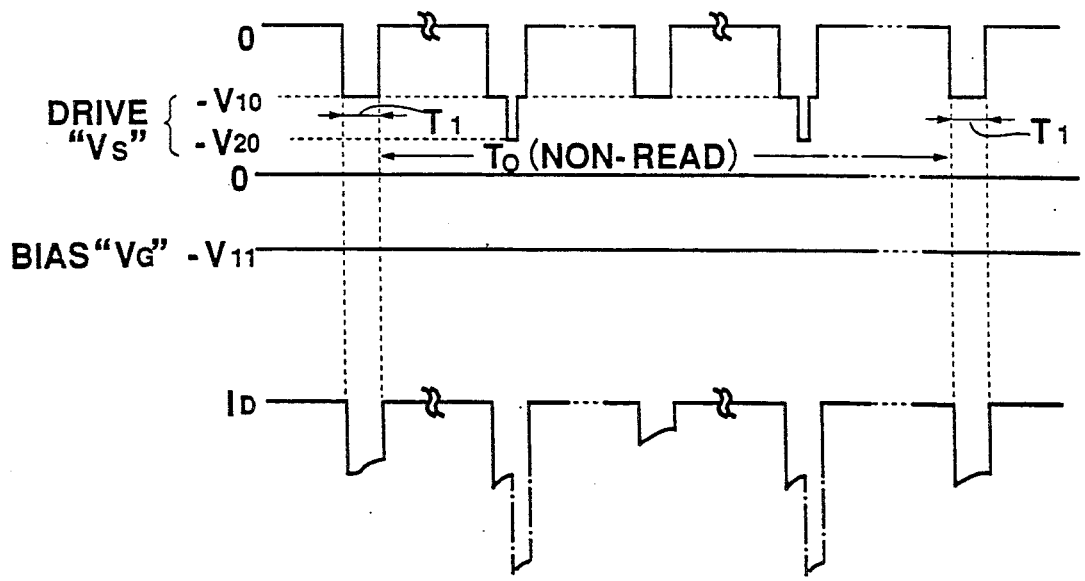

As previously described, to improve the photo-responsive characteristic of the second image sensor, the second bias voltage "$-V_{12}$" different from the first bias voltage "$-V_{11}$" was selectively applied to the auxiliary electrode 12. In accordance with a linear image sensor of the third preferred embodiment, the similar improvement may be achieved as illustrated in FIGS. 8 and 9 where a single bias voltage ($-V_{11}$) applied to the auxiliary electrode 12 is kept constant, and a drive pulse voltage to the source electrode 16 is selectively changed between $-V_{10}$ and $-V_{20}$ ($|-V_{20}| > |-V_{10}|$). In this preferred embodiment, as shown in FIG. 8, another drive power source 31 is newly employed and another switch $SX_1$ is connected to change two drive power sources 21 and 31. It is of course possible to combine the idea of the second preferred embodiment shown in FIGS. 5 and 6 with the idea of the third preferred embodiment shown in FIGS. 8 and 9 so as to improve the resultant photo-responsive characteristic.

In short, according to the third preferred embodiment, at least one of these biasing voltages of the drive pule ($-V_{10}$, $-V_{20}$) may be controlled in such a manner that the potential between the main electrode to which the carriers are to be injected and also the auxiliary electrode should become such a drive voltage for emphasizing the carrier injection which is effected during the read time period.

Alternatively, according to the third preferred embodiment, the bias voltage "$V_G$" may be changed from $-V_{11}$ into $-V_{12}$ during a portion of the read time period "$T_1$", and also the drive pulse voltage "$V_S$" to the source electrode 16 may be changed from $-V_{10}$ to $-V_{20}$.

Fourth Image Sensor

Figure 10:
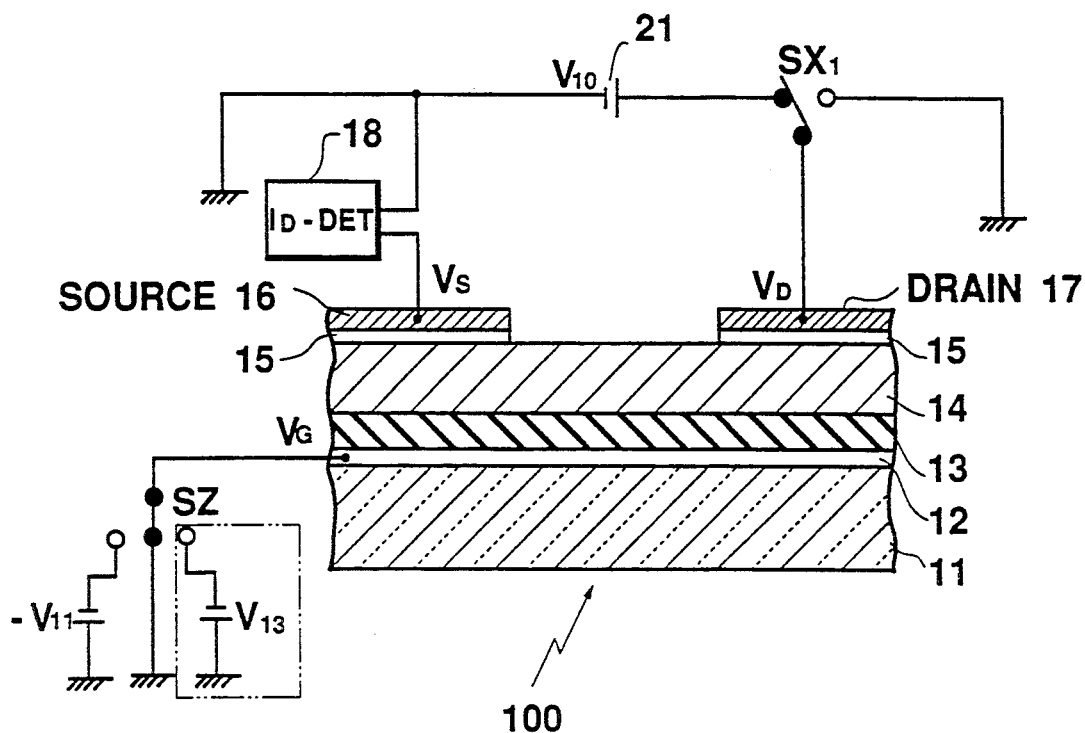
Figure 11:
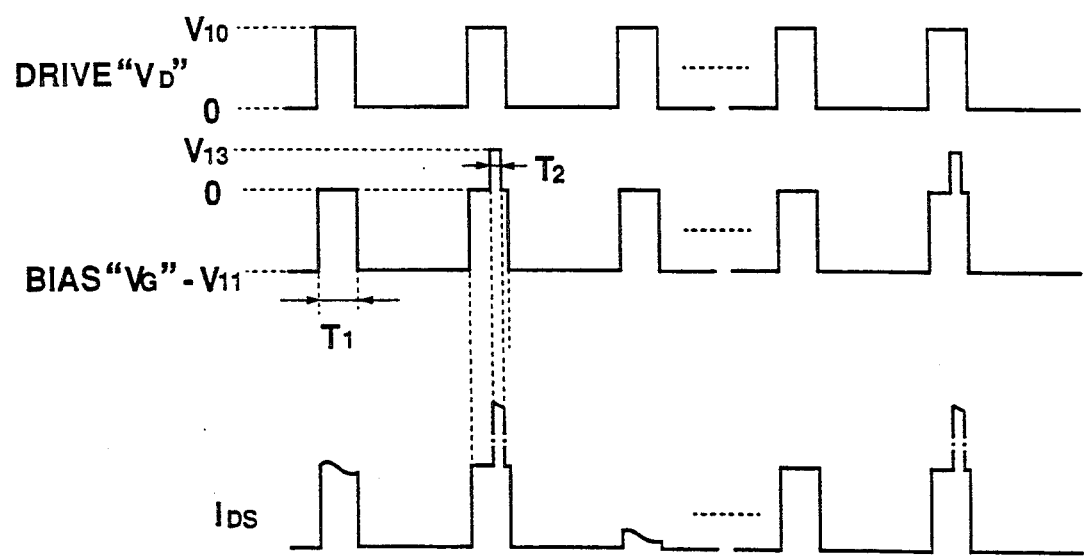

FIGS. 10 and 11 represent a linear image sensor and a drive method thereof according to a fourth preferred embodiment of the present invention.

As previously described in connection with the third preferred embodiment, the first and second drive pulses ($-V_{10}$; $-V_{20}$) are applied to the source electrode 16 of the image sensor during the read time period "$T_1$" in order to improve the voltage response characteristic thereof. In accordance with this fourth preferred embodiment, the following features are provided. That is, two different bias power sources having the voltages of "$-V_{11}$" and "ground potential". While the drive voltage pulse "$V_{10}$" is applied to the drain 17 in the time period "$T_1$", the auxiliary electrode 12 is grounded via a switch "SZ". While no drive voltage pulse "$V_{10}$" is applied to the drain 17, another bias voltage "$-V_{11}$" is applied to the auxiliary electrode 12. As a result, even if the drive voltage pulse is applied to the drain electrode 17 of the image sensor, which is similar to the conventional image sensor driving method, the voltage response characteristic of the fourth preferred embodiment can be similarly improved. This is because the potential of the auxiliary electrode 12 is varied from ($-V_{11}$) to the ground potential, so that a voltage having a rising edge by which the electron injection can be accelerated from the source electrode 16 appears between the source electrode 16 and auxiliary electrode 12.

Modifications

The present invention is not apparently restricted to the above-described preferred embodiments, but may be modified, substituted, and changed without departing from the technical scope and spirit of the present invention. For instance, another bias power source having a voltage "$V_{13}$" may be newly employed instead of the above-described bias power source ($-V_{11}$) in the image sensor shown in FIG. 10. Similar to the previous preferred embodiment, a bias voltage higher than the ground potential, e.g., 7 volts, may be applied to the auxiliary electrode 12 during an arbitrary time period "$T_2$" (approximately 1 microsecond) while the drive voltage pulse is applied within the non-read time period. As a result, the photo-responsive characteristic of this modified sensor may be further improved.

Also, although the electrons functioned as the carrier for carrying the current flowing through the semiconductor layer in the above-described preferred embodiments, holes may function as this carrier. That is, in case of an intrinsic type semiconductor layer or a P type semiconductor, a doped layer for an ohmic contact may be formed in a P type and also the polarity of the drive power source may be reversed.

In the above-described preferred embodiments, the image sensors are a so-called "linear image sensor". Apparently, similar effects to those of the line image sensor may be achieved in a so-called "area image sensor" in which the above image sensors are two-dimensionally arranged and the equivalent circuit thereof is essentially equal to that of the image sensors.

While has been described above, according to the linear image sensor of the present invention, not only the photo-responsive characteristic, but also the voltage response characteristic thereof can be improved even when the image sensor is arranged in a matrix form and driven by the drive pulse. As a consequence, the image sensor can correctly respond at a high speed to the incident light, and thus the high-speed image sensor can be realized.

What is claimed is:

1. A method for driving an image sensor, including a pair of first and second main electrodes fabricated on a semiconductor layer in such a manner that the first and second main electrodes are separated from each other via light receiving region, an insulating layer stacked on the semiconductor layer, and an auxiliary electrode stacked on said insulating layer, comprising the steps of:
    applying a constant bias voltage to the auxiliary electrode over both a read time period and a non-read time period of a signal current of the image sensor;
    applying to the first main electrode a drive voltage pulse by which a carrier injection into the semiconductor layer is accelerated to vary a potential at the first main electrode with respect to the auxiliary electrode at least during the read time period of the signal current; and,
    deriving the signal current from the second main electrode during only the read time period of the signal current.

2. An image sensor driving method as claimed in claim 1, wherein said bias voltage is selected to be substantially equal to said drive voltage.

3. An image sensor driving method as claimed in claim 1, wherein thicknesses of said insulating layer and auxiliary electrode are selected to satisfy the relationship:

$$n \cdot d = m \cdot \lambda / 4$$

where "n" denotes a refraction index, "$\lambda$" indicates a wavelength of incoming light, "m" is selected from an odd number (1, 3, 5, - - - ) and "d" represents a layer thickness.

4. An image sensor driving method as claimed in claim 1, the image sensor further comprising:
    a substrate made of glass through which the light passes into the semiconductor layer.

5. An image sensor driving method as claimed in claim 4, wherein said first and second main electrodes are light-refractive.

6. An image sensor driving method as claimed in claim 1, wherein said first and second main electrodes are transparent and said auxiliary electrode is light-refractive.

7. A method for driving an image sensor, including a pair of first and second main electrodes fabricated on a semiconductor layer in such a manner that the first and second main electrodes are separated from each other via a light receiving region, an insulating layer stacked on the semiconductor layer, and an auxiliary electrode stacked on said insulating layer, comprising the steps of:
    applying a first bias voltage to the auxiliary electrode at least during a read time period of a signal current of the image sensor;
    applying to the first main electrode a drive voltage pulse by which a carrier injection into the semiconductor layer is accelerated to vary a potential at the first main electrode with respect to the auxiliary electrode over both the read time period and a non-read time period of the signal current;
    deriving the signal current from the second main electrode during only the read time period of the signal current, while applying both said first bias voltage and said drive voltage pulse to said auxiliary electrode and said first main electrode, and applying a second bias voltage higher than the first bias voltage to the auxiliary electrode during only a preselected time period within the non-read time period while applying the drive voltage pulse to said first main electrode.

8. An image sensor driving method as claimed in claim 7, wherein said first bias voltage is selected to be substantially equal to said drive voltage.

9. An image sensor driving method as claimed in claim 8, wherein said first bias voltage is selected to be $-12$ v, whereas said second bias voltage is selected to be $-7$ v.

10. An image sensor driving method as claimed in claim 7, wherein said read time period of the signal current is approximately 5 microseconds, whereas said preselected time period thereof is approximately 1 microsecond.

11. An image sensor driving method as claimed in claim 7, wherein thicknesses of said insulating layer and auxiliary electrode are selected to satisfy the relationship:

$$n \cdot d = m \cdot \lambda / 4$$

where "n" denotes a refraction index, "λ" indicates a wavelength of incoming light, "m" is a selected odd number (1, 3, 5, - - - ) and "d" represents a layer thickness.

12. An image sensor driving method as claimed in claim 7, further comprising:
a substrate made of glass, through which the light passes into the semiconductor layer.

13. An image sensor driving method as claimed in claim 12, wherein said first and second main electrodes are light-reflective.

14. An image sensor driving method as claimed in claim 7, wherein said first and second main electrodes are transparent and said auxiliary electrode is light-reflective.

15. A method for driving an image sensor, including a pair of first and second main electrodes fabricated on a semiconductor layer, in such a manner that the first and second main electrodes are separated from each other via a light receiving region, an insulating layer stacked on the semiconductor layer and an auxiliary electrode stacked on said insulating layer, comprising the steps of:
applying a constant bias voltage to the auxiliary electrode over both a read time period and a non-read time period of a signal current of the image sensor;
applying to the first main electrode a first drive voltage pulse by which a carrier injection into the semiconductor layer is accelerated to vary a potential at the first main electrode with respect to the auxiliary electrode at least during the read time period of the signal current;

applying to the first main electrode a second drive voltage pulse higher than the first drive voltage pulse during a preselected time period within the non-read time period in combination with the first drive voltage pulse; and deriving the second current from the second main electrode during only the read time period of the signal current.

16. A method for driving an image sensor, including a pair of first and second main electrodes fabricated on a semiconductor layer in such a manner that the first and second main electrodes are separated from each other via a light receiving region, an insulating layer stacked on the semiconductor layer and an auxiliary electrode stacked on said insulating layer, the method comprising the steps of:
applying to the second main electrode, a drive voltage pulse by which a carrier injection into the semiconductor layer is accelerated to vary a potential at the second main electrode with respect to the auxiliary electrode;
applying a first bias voltage to the auxiliary electrode while the drive voltage pulse is being applied;
applying a second bias voltage lower than the first bias voltage to the auxiliary electrode while no drive voltage pulse is being applied; and
deriving a signal current from the first main electrode during only a read time period of the signal current while the drive voltage pulse is being applied.

17. A method for driving an image sensor, including a pair of first and second main electrodes fabricated on a semiconductor layer in such a manner that the first and second main electrodes are separated from each other via a light receiving region, an insulating layer stacked on the semiconductor layer, and an auxiliary electrode stacked on said insulating layer, comprising the steps of:
applying to the second main electrode a drive voltage pulse by which a carrier injection into the semiconductor layer is accelerated to vary a potential at the second main electrode with respect to the auxiliary electrode;
applying a first bias voltage to the auxiliary electrode while the drive voltage pulse is being applied;
applying a second bias voltage higher than the first bias voltage to the auxiliary electrode during a preselected time period while the drive voltage pulse is being applied within a non-read time period of a signal current; and
deriving the signal current from the first main electrode only during a read time period of the signal current.

18. An image sensor driving method as claimed in claim 17, wherein said read time period of the signal current is approximately 5 microseconds, whereas said preselected time period thereof is approximately 1 microsecond.

* * * * *